(12) United States Patent
Bishop et al.

(10) Patent No.: US 11,003,811 B2
(45) Date of Patent: May 11, 2021

(54) GENERATING SAMPLES OF OUTCOMES FROM A QUANTUM SIMULATOR

(71) Applicant: International Business Machines Corporation, Armonk, NY (US)

(72) Inventors: Lev Samuel Bishop, Dobbs Ferry, NY (US); Christopher J. Wood, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 414 days.

(21) Appl. No.: 15/892,766

(22) Filed: Feb. 9, 2018

(65) Prior Publication Data

US 2019/0251213 A1    Aug. 15, 2019

(51) Int. Cl.
| | |
|---|---|
| *G06F 17/50* | (2006.01) |
| *G06F 30/20* | (2020.01) |
| *G06F 7/58* | (2006.01) |
| *G06N 10/00* | (2019.01) |
| *G06N 20/00* | (2019.01) |
| *G06N 5/00* | (2006.01) |
| *G06F 111/20* | (2020.01) |

(52) U.S. Cl.
CPC .............. *G06F 30/20* (2020.01); *G06F 7/588* (2013.01); *G06N 5/003* (2013.01); *G06N 10/00* (2019.01); *G06N 20/00* (2019.01); *G06F 2111/20* (2020.01)

(58) Field of Classification Search
CPC ......... G06F 30/20; G06F 7/588; G06N 10/00; G06N 20/00; G06N 5/003
USPC ..................................................... 703/13, 14
See application file for complete search history.

(56) References Cited

U.S. PATENT DOCUMENTS

| | | | |
|---|---|---|---|
| 4,122,440 A | 10/1978 | Langdon, Jr. et al. | |
| 6,289,296 B1 | 9/2001 | Umeno | |
| 7,742,905 B2* | 6/2010 | Vanspauwen | G06F 30/20 703/13 |
| 8,131,571 B2 | 3/2012 | Vadiveloo | |
| 2003/0093451 A1* | 5/2003 | Chuang | B82Y 10/00 708/520 |
| 2006/0155525 A1 | 7/2006 | Aguilar, Jr. et al. | |
| 2008/0140749 A1 | 6/2008 | Amato et al. | |
| (Continued) | | | |

FOREIGN PATENT DOCUMENTS

WO    2017/069835 A2    4/2017

OTHER PUBLICATIONS

International Search Report and Written Opinion received for PCT Application Serial No. PCT/EP2019/051141 dated May 7, 2019, 17 pages.

(Continued)

*Primary Examiner* — Andre Pierre Louis
(74) *Attorney, Agent, or Firm* — Amin, Turocy & Watson, LLP

(57) ABSTRACT

Techniques for improving a quantum simulator are provided. In one example, a system includes a simulation component and a snapshot component. The simulation component determines a set of random numbers and simultaneously provides the set of random numbers to an arithmetic decoder to perform a stochastic simulation process. The snapshot component generates snapshot data indicative of a state of the stochastic simulation process based on data associated with a stochastic branching point for the stochastic simulation process.

25 Claims, 10 Drawing Sheets

(56) References Cited

U.S. PATENT DOCUMENTS

| | | | |
|---|---|---|---|
| 2013/0096698 A1* | 4/2013 | Ulyanov | G05B 13/0295 |
| | | | 700/30 |
| 2013/0182965 A1* | 7/2013 | Rossato | G06T 9/00 |
| | | | 382/233 |
| 2016/0156909 A1 | 6/2016 | Matsunobu et al. | |
| 2016/0241854 A1 | 8/2016 | Cheng et al. | |
| 2016/0353110 A1 | 12/2016 | Zhang et al. | |
| 2017/0228195 A1 | 8/2017 | Bartik et al. | |

OTHER PUBLICATIONS

Cerf et al., "Monte Carlo Simulation of Quantum Computation", arxiv.org, Mar. 26, 1997, pp. 1-12.

Navarro et al., "Adaptive multi-GPU Exchange Monte Carlo for the 3D Random Field Ising Model", Computer Physics Communications, vol. 205, Apr. 27, 2016, pp. 48-60.

Moussa et al., "Decision Tree Module within Decision Support Simulation System", Proceedings of the Winter Simulation Conference, IEEE, Dec. 5, 2004, 9 pages.

\* cited by examiner

GENERATING SAMPLES OF OUTCOMES FROM A QUANTUM SIMULATOR

BACKGROUND

Quantum computing employs quantum physics to encode information rather than binary digital techniques based on transistors. For example, a quantum computer can employ quantum bits (e.g., qubits) that operate according to a superposition principle of quantum physics and an entanglement principle of quantum physics. The superposition principle of quantum physics allows each qubit to represent both a value of "1" and a value of "0" at the same time. The entanglement principle of quantum physics states allows qubits in a superposition to be correlated with each other. For instance, a state of a first value (e.g., a value of "1" or a value of "0") can depend on a state of a second value. As such, a quantum computer can employ qubits to encode information rather than binary digital techniques based on transistors. Often times, it is desirable to simulate a quantum computer. Conventionally, a quantum computer can be employed for quantum simulation. For instance, a quantum simulator can employ a quantum computer to perform a set of calculations to determine information associated with a quantum system. In one example, a quantum simulator can employ a quantum computer to perform a set of calculations to determine information associated with a physics model. For example, Amato et al. (U.S. Patent Publication No. 2008/0140749) discloses "a quantum algorithm where the superposition, entanglement with interference operators determined for performing selection, crossover, and mutation operations based upon a genetic algorithm." Amato also discloses that "moreover, entanglement vectors generated by the entanglement operator of the quantum algorithm may be processed by a wise controller implementing a genetic algorithm before being input to the interference operator." Amato further states that "this algorithm may be implemented with a hardware quantum gate or with a software computer program running on a computer," and "further, the algorithm can be used in a method for controlling a process and a relative control device of a process which is more robust, requires very little initial information about dynamic behavior of control objects in the design process of an intelligent control system, or random noise insensitive (invariant) in a measurement system and in a control feedback loop." However, conventional simulators of a quantum computer are often inefficient and/or computationally expensive. As such, conventional simulators of a quantum computer can be improved.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for facilitating classical simulation of a quantum computer are described.

According to an embodiment, a system can comprise a simulation component and a snapshot component. The simulation component can determine a set of random numbers and simultaneously provide the set of random numbers to an arithmetic decoder to perform a stochastic simulation process. The snapshot component can generate snapshot data indicative of a state of the stochastic simulation process based on data associated with a stochastic branching point for the stochastic simulation process. In an embodiment, the system can provide an improved stochastic simulation process that includes a reduced amount of time for processing by the stochastic simulation process, a reduced amount of storage utilized by the stochastic simulation process, and/or a reduced amount of processing by the stochastic simulation process. In certain embodiments, the simulation component can perform a quantum circuit simulation process associated with a quantum circuit based on the set of random numbers simultaneously provided to the arithmetic decoder. In an embodiment, the simulation component can generate a quantum wavefunction for the stochastic simulation process based on the data associated with the stochastic branching point for the stochastic simulation process. In certain embodiments, the simulation component can perform another portion of the stochastic simulation process based on the snapshot data that is indicative of the state of the stochastic simulation process. In an embodiment, the simulation component can alter one or more portions of the stochastic simulation process based on the snapshot data that is indicative of the state of the stochastic simulation process. In another embodiment, the simulation component can avoid processing one or more portions of the stochastic simulation process based on the snapshot data that is indicative of the state of the stochastic simulation process. In certain embodiments, the simulation component can update a data list for the stochastic simulation process based on the snapshot data that is indicative of the state of the stochastic simulation process. In an embodiment, the simulation component can add the set of random numbers to a data list for the stochastic simulation process and updates one or more indices in the data list at the stochastic branching point for the stochastic simulation process. In another embodiment, the simulation component can partition the data list based on a binary search process at the stochastic branching point for the stochastic simulation process. In yet another embodiment, the simulation component can alter a random number from the set of random numbers to provide improved numerical precision during the stochastic simulation process. In yet another embodiment, the simulation component can generate the snapshot data indicative of the state of the stochastic simulation process to reduce processing time associated with the stochastic simulation process.

According to another embodiment, a computer-implemented method is provided. The computer-implemented method can comprise determining, by a system operatively coupled to a processor, a set of random numbers. The computer-implemented method can also comprise performing, by the system, a stochastic simulation process by simultaneously providing the set of random numbers to an arithmetic decoder. Furthermore, the computer-implemented method can comprise generating, by the system, snapshot data indicative of a state of the stochastic simulation process based on data associated with a stochastic branching point for the stochastic simulation process. In an embodiment, the computer-implemented method can provide an improved stochastic simulation process that includes a reduced amount of time for processing by the stochastic simulation process, a reduced amount of storage utilized by the stochastic simulation process, and/or a reduced amount of processing by the stochastic simulation process. In certain embodiments, the performing the stochastic simulation process can comprise performing a quantum circuit simulation process associated with a quantum circuit based on the set of random numbers. In another embodiment, the computer-implemented method can further provide performing, by the system, one or more other portions of the stochastic simulation process based on the snapshot data indicative of the state of the stochastic simulation process. In yet another embodiment, the computer-implemented method can further provide avoiding, by the system, processing of one or more other portions of the stochastic simulation process based on the snapshot data indicative of the state of the stochastic simulation process. In yet another embodiment, the computer-implemented method can further provide altering, by the system, a random number from the set of random numbers to provide improved numerical precision during the stochastic simulation process. In certain embodiments, the generating the snapshot data can comprise improving the stochastic simulation process.

According to yet another embodiment, a computer program product for improving a quantum simulator can comprise a computer readable storage medium having program instructions embodied therewith. The program instructions can be executable by a processor and cause the processor to determine, by the processor, a set of random numbers. The program instructions can also cause the processor to perform, by the processor, a quantum circuit simulation process associated with a quantum circuit by simultaneously providing the set of random numbers to an arithmetic decoder. Furthermore, the program instructions can also cause the processor to generate, by the processor, snapshot data indicative of a state of the quantum circuit simulation process based on data associated with a stochastic branching point for the quantum circuit simulation process. In an embodiment, the computer program product can provide an improved quantum circuit simulation process that includes a reduced amount of time for processing by the quantum circuit simulation process, a reduced amount of storage utilized by the quantum circuit simulation process, and/or a reduced amount of processing by the quantum circuit simulation process. In certain embodiments, the program instructions can also cause the processor to perform, by the processor, one or more other portions of the quantum circuit simulation process based on the snapshot data that is indicative of the state of the quantum circuit simulation process. In certain embodiments, the program instructions can also cause the processor to alter, by the processor, one or more portions of the quantum circuit simulation process based on the snapshot data that is indicative of the state of the quantum circuit simulation process According to yet another embodiment, a system can comprise a random number component, an entropy coding component and a snapshot component. The random number component can generate a set of random numbers. The entropy coding component can perform entropy coding based on the set of random numbers, where the set of random numbers is simultaneously provided to an arithmetic decoder employed by the entropy coding component. The snapshot component can generate snapshot data indicative of a state of a stochastic simulation process based on data associated with a stochastic branching point for the stochastic simulation process. In an embodiment, the system can provide an improved stochastic simulation process that includes a reduced amount of time for processing by the stochastic simulation process, a reduced amount of storage utilized by the stochastic simulation process, and/or a reduced amount of processing by the stochastic simulation process. In certain embodiments, the entropy coding component can perform one or more portions of the entropy coding based on the snapshot data that is indicative of the state of the stochastic simulation process. In certain embodiments, the random number component can alter a random number from the set of random numbers to provide improved numerical precision during the stochastic simulation process.

According to yet another embodiment, a computer-implemented method is provided. The computer-implemented method can comprise determining, by a system operatively coupled to a processor, a set of random numbers. The computer-implemented method can also comprise performing, by the system, a quantum circuit simulation process associated with a quantum circuit by simultaneously providing the set of random numbers to an arithmetic decoder. Furthermore, the computer-implemented method can comprise generating, by the system, snapshot data indicative of a state of the quantum circuit simulation process based on data associated with a stochastic branching point for the quantum circuit simulation process. In an embodiment, the computer-implemented method can provide an improved quantum circuit simulation process that includes a reduced amount of time for processing by the quantum circuit simulation process, a reduced amount of storage utilized by the quantum circuit simulation process, and/or a reduced amount of processing by the quantum circuit simulation process. In certain embodiments, the computer-implemented method can further comprise performing, by the system, one or more other portions of the quantum circuit simulation process based on the snapshot data indicative of the state of the quantum circuit simulation process.

DETAILED DESCRIPTION

Figure 1:
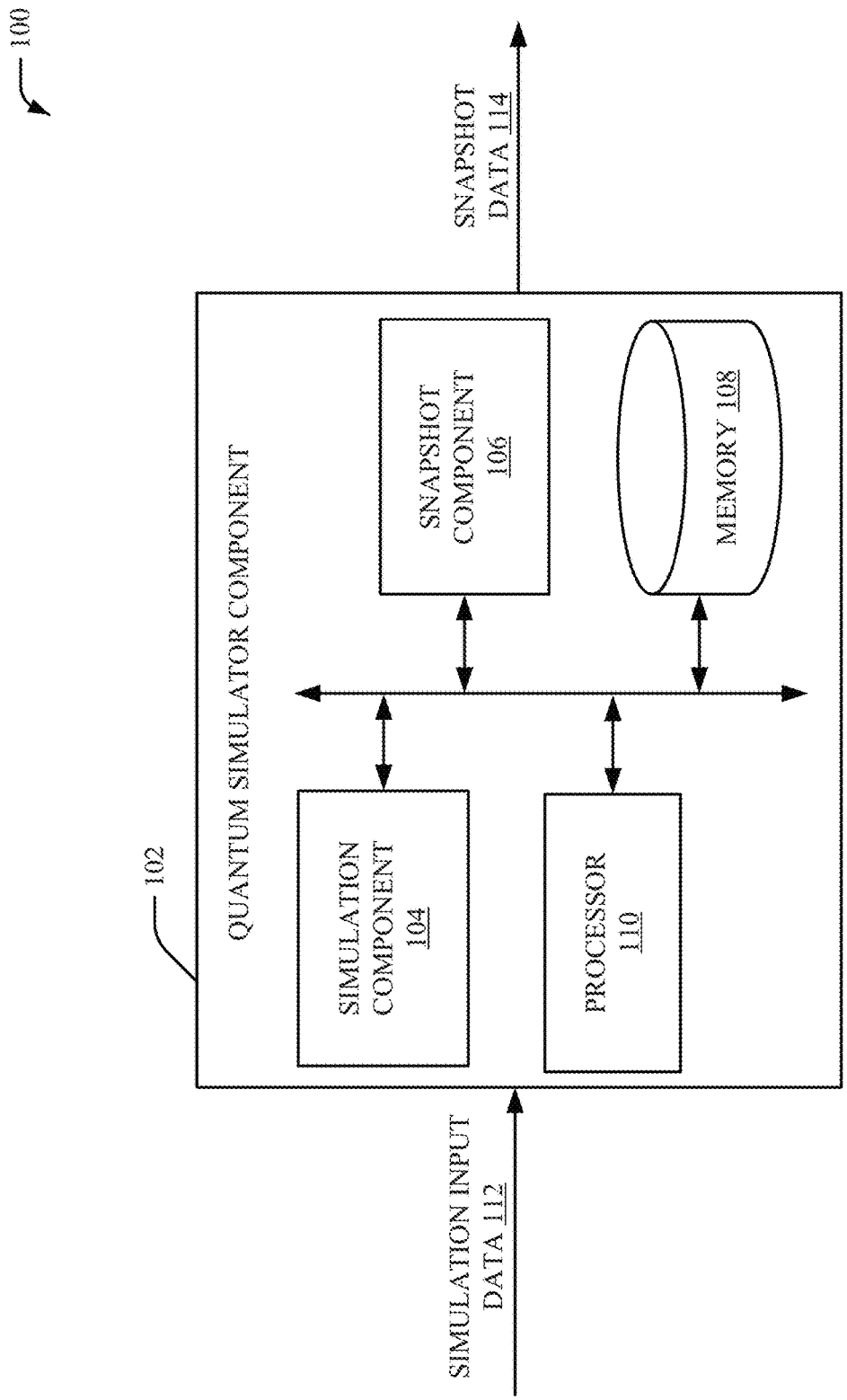
FIG. 1 illustrates a block diagram of an example, non-limiting system that includes a quantum simulator component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing employs quantum physics to encode information rather than binary digital techniques based on transistors. For example, a quantum computer can employ quantum bits (e.g., qubits) that operate according to a superposition principle of quantum physics and an entanglement principle of quantum physics. The superposition principle of quantum physics allows each qubit to represent both a value of "1" and a value of "0" at the same time. The entanglement principle of quantum physics states allows qubits in a superposition to be correlated with each other. For instance, a state of a first value (e.g., a value of "1" or a value of "0") can depend on a state of a second value. As such, a quantum computer can employ qubits to encode information rather than binary digital techniques based on transistors. Often times, it is desirable to simulate a quantum computer. Conventionally, a quantum computer can be employed for quantum simulation. For instance, a quantum simulator can employ a quantum computer to perform a set of calculations to determine information associated with a quantum system. In one example, a quantum simulator can employ a quantum computer to perform a set of calculations to determine information associated with a physics model. However, conventional simulators of a quantum computer are often inefficient and/or computationally expensive. As such, conventional simulators of a quantum computer can be improved.

To address these and/or other issues, embodiments described herein include systems, computer-implemented methods, and computer program products for classical simulation of a quantum computer. For instance, one or more classical computing resources (e.g., computing run time, memory, etc.) can be minimized for simulating stochastic evolution of a quantum state of a quantum computer by improving samples of outcomes from a quantum simulator. As used herein, "classical" can refer to classical computer processing using a digital computer (e.g., a computer that is not a quantum computer). In an embodiment, entropy coding such as, for example, arithmetic coding, can be employed to optimize determination of a state of simulation by a quantum simulator. A set of N random numbers can be generated at a start of a simulation process for a quantum simulator where N is a number of samples for the quantum simulator. The set of N random numbers can be, for example, a set of random real numbers between an interval [0,1]. In an aspect, an entropy decoding algorithm can be performed using the set of N random numbers to determine and/or select a processing branch during the simulation process for the quantum simulator. In one example, an arithmetic decoding algorithm can be performed using the set of N random numbers to determine and/or select a processing branch during the simulation process for the quantum simulator. A processing branch can be determined and/or selected at a branch point associated with the simulation process for the quantum simulator. A branch point can be, for example, a stochastic decision point during the simulation process for the quantum simulator. In another aspect, an entire set of data can be decoded simultaneously. Therefore, neighboring data values from a particular data value in the set of data can be determined at each branch point. Furthermore, it can be determined whether another processing branch during the simulation process for the quantum simulator is employed by another data value in the set of data. If so, a snapshot of the simulation process for the quantum simulator can be generated. The snapshot can represent a state of the simulation process. The snapshot can be employed at one or more other instances during the simulation process for the quantum simulator to, for example, avoid redoing one or more calculations during the simulation process. In an example where the set of N random numbers are chosen on the interval [0, 1], the interval [0, 1] can be successively subdivided according to a set of branch points to generate a decision tree indicative of a tree-like model associated with a set of processing decisions during simulation. The set of N random numbers can be employed to determine a set of paths through the decision tree during simulation. A snapshot can also be obtained before a branch point of the decision tree to save simulation costs up to the branch point by resuming computation from the snapshot at one or more decision forks in the decision tree.

In another embodiment, a stochastic simulation can be performed by generating a set of random numbers and providing the set of random numbers to an arithmetic decoder. Presence and/or absence of one or more samples at a stochastic branching point can be employed during the stochastic simulation to inform a checkpointing process for the stochastic simulation. In certain embodiments, the stochastic simulation can be a simulation of a quantum circuit via wavefunction evolution. In another embodiment, the set of random numbers can be implemented via a sorted data list and tracking of a remaining set of data at a decision point can be performed by updating indices into the sorted data list. In an aspect, partitioning of a remaining sublist can be chosen at a decision point by performing a binary search into the sorted data list between current indices. In another aspect, the set of random numbers can be initially generated with a limited numerical precision and additional precision can be dynamically added during the stochastic simulation. For example, additional precision can be dynamically added during the stochastic simulation by determining additional random numbers, adding new entropy as one or more additional digits, etc. In certain embodiments, ordering of data values for a random number form the set of random numbers can be reordered to facilitate adding additional precision.

As such, accuracy of classical simulation of a quantum computer and/or efficiency of classical simulation of a quantum computer can be improved. Furthermore, an amount of time to perform a quantum simulation process, an amount of processing performed by a quantum simulation process, and/or an amount of storage utilized by a quantum simulation process can be reduced. Moreover, performance a quantum circuit and/or a classical processor associated with a quantum simulator can be improved, efficiency of a quantum circuit and/or a classical processor associated with a quantum simulator can be improved, timing characteristics of a quantum circuit and/or a classical processor associated with a quantum simulator can be improved, power characteristics of a quantum circuit and/or a classical processor associated with a quantum simulator can be improved, and/or another characteristic of a quantum circuit and/or a classical processor associated with a quantum simulator can be improved.

FIG. 1 illustrates a block diagram of an example, non-limiting system 100 for improving samples of outcomes from a quantum simulator in accordance with one or more embodiments described herein. In various embodiments, the system 100 can be a quantum simulation system associated with technologies such as, but not limited to, classical computing technologies, quantum simulation technologies, quantum circuit technologies, quantum processor technologies, quantum computing technologies, artificial intelligence technologies, medicine and materials technologies, supply chain and logistics technologies, financial services technologies, and/or other digital technologies. The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with a quantum simulator component, etc.) for carrying out defined tasks related to machine learning. The system 100 and/or components of the system 100 can be employed to solve new problems that arise through advancements in technologies mentioned above, computer architecture, and/or the like. One or more embodiments of the system 100 can provide technical improvements to simulations of performance of a quantum computer, quantum circuit systems, classical simulation systems, classical computing systems, artificial intelligence systems, medicine and materials systems, supply chain and logistics systems, financial services systems, and/or other systems. One or more embodiments of the system 100 can also provide technical improvements to a quantum device (e.g., a quantum processor, a quantum computer, etc.) by improving processing performance of the quantum device, improving processing efficiency of the quantum device, improving processing characteristics of the quantum device, improving timing characteristics of the quantum device and/or improving power efficiency of the quantum device.

In the embodiment shown in FIG. 1, the system 100 can include a quantum simulator component 102. As shown in FIG. 1, the quantum simulator component 102 can include a simulation component 104 and a snapshot component 106. Aspects of the quantum simulator component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the quantum simulator component 102 can also include memory 108 that stores computer executable components and instructions. Furthermore, the quantum simulator component 102 can include a processor 110 to facilitate execution of the instructions (e.g., computer executable components and corresponding instructions) by the quantum simulator component 102. As shown, the simulation component 104, the snapshot component 106, the memory 108 and/or the processor 110 can be electrically and/or communicatively coupled to one another in one or more embodiments.

The quantum simulator component 102 (e.g., the simulation component 104 of the quantum simulator component 102) can receive simulation input data 112. The simulation input data 112 can be, for example, information associated with a quantum system. For example, the simulation input data 112 can be associated with a physics model. In another example, the simulation input data 112 can be associated with a statistical model. In an embodiment, the simulation input data 112 can be associated with a quantum circuit. For instance, the simulation input data 112 can include a machine-readable description of a quantum circuit. The quantum circuit can be a model for one or more quantum computations associated with a sequence of quantum gates. In one example, the simulation input data 112 can textually describe one or more qubit gates of a quantum circuit associated with one or more qubits. Additionally or alternatively, the simulation input data 112 can include marker data indicative of information for one or more marker elements that tag one or more locations associated with a quantum circuit. For example, the marker data can include one or more marker elements that tag a location of one or more qubit gates of a quantum circuit associated with one or more qubits.

The simulation component 104 can determine a set of random numbers. The set of random numbers can be, for example, a set of random real numbers. In an aspect, the set of random numbers can be between a first value (e.g., a value equal to "0") and a second value (e.g., a value equal to "1"). In certain embodiments, the set of random numbers can be initially generated with limited numerical precision and additional precision for the set of random numbers can be dynamically added during a simulation process. For example, a random number from the set of random numbers can be initially generated with a certain number of bits and additional bits for the random number can be dynamically added during a simulation process. As such, the simulation component can alter at least one random number from the set of random numbers to provide, for example, improved numerical precision during the stochastic simulation process. Additionally, the simulation component 104 can simultaneously provide the set of random numbers to an arithmetic decoder to perform a stochastic simulation process. The stochastic simulation process can be, for example, a simulation process that analyzes, monitors and/or simulates transformation of outcomes for the simulation process that can change randomly. In one embodiment, the stochastic simulation process can be a quantum simulation process (e.g., a quantum circuit simulation process) for a quantum simulator. For example, the quantum simulation process can be, for example, a classical simulation process for a quantum circuit that employs qubits to encode information and/or perform one or more calculations. In an embodiment, the simulation component 104 can perform a quantum circuit simulation process associated with a quantum circuit based on the set of random numbers simultaneously provided to the arithmetic decoder. In another embodiment, the simulation component 104 can generate a quantum wavefunction for the stochastic simulation process based on the data associated with the stochastic branching point for the stochastic simulation process. In an embodiment, simulation of a quantum circuit based on the set of random numbers can be employed to determine a set of outcomes of stochastic circuit operations such as, for example, one or more measurements, one or more errors, etc.

The snapshot component 106 can generate snapshot data 114 based on data associated with a stochastic branching point for the stochastic simulation process. The snapshot data 114 can be indicative of a state of the stochastic simulation process. The stochastic branching point can be a branch point during the stochastic simulation process. For example, the stochastic branching point can be a stochastic decision point during the stochastic simulation process. In an embodiment, the snapshot data 114 can be indicative of a state of the quantum circuit simulation process. For example, a stochastic branching point of the quantum circuit simulation process can be related to a noise event associated with a quantum circuit. In another example, a stochastic branching point of the quantum circuit simulation process can be related to a measurement associated with a quantum circuit. In an embodiment, the simulation component 104 can perform another portion of the stochastic simulation process based on the snapshot data 114. For example, in response to a determination during the stochastic simulation process that a stochastic branching point satisfies a defined criterion, the stochastic simulation process can employ the snapshot data 114 rather that recalculating one or more calculations associated with the stochastic simulation process. A defined criterion associated with the stochastic branching point can be, for example, a determination that one or more calculations for the stochastic simulation process have been previously performed during the stochastic simulation process. In another embodiment, the simulation component 104 can alter one or more portions of the stochastic simulation process based on the snapshot data 114. For example, a processing decision tree and/or a processing workflow for the stochastic simulation process can be altered based on the snapshot data 114. In certain embodiments, the simulation component 104 can avoid processing one or more portions of the stochastic simulation process based on the snapshot data 114. For example, the simulation component 104 can avoid redoing one or more calculations during the stochastic simulation process by employing the snapshot data 114. In yet another embodiment, the simulation component 104 can update a data list for the stochastic simulation process based on the snapshot data 114. For example, the data list can be updated to track data at a stochastic branching point for the stochastic simulation process. In an aspect, the simulation component 104 can add the set of random numbers to a data list for the stochastic simulation process. Furthermore, the simulation component 104 can update one or more indices in the data list at the stochastic branching point for the stochastic simulation process. In another aspect, the simulation component 104 can partition the data list based on a binary search process at the stochastic branching point for the stochastic simulation process. In certain embodiments, the simulation component 104 can generate stochastic simulation output data. The stochastic simulation output data can be data generated by the stochastic simulation process. For example, the stochastic simulation output data can include a set of samples of outcomes from the stochastic simulation process. In one example, the stochastic simulation output data can include a set of samples of outcomes from a quantum circuit simulation process (e.g., from a quantum simulator).

In certain embodiments, the snapshot component 106 can generate the snapshot data 114 based on classifications, correlations, inferences and/or expressions associated with principles of artificial intelligence. For instance, the snapshot component 106 can employ an automatic classification system and/or an automatic classification process to determine the snapshot data 114. In one example, the snapshot component 106 can employ a probabilistic and/or statistical-based analysis (e.g., factoring into the analysis utilities and costs) to learn and/or generate inferences with respect to the stochastic simulation process. In an aspect, the snapshot component 106 can include an inference component (not shown) that can further enhance aspects of the snapshot component 106 utilizing in part inference based schemes to facilitate learning and/or generating inferences associated with the stochastic simulation process. The snapshot component 106 can employ any suitable machine-learning based techniques, statistical-based techniques and/or probabilistic-based techniques. For example, the snapshot component 106 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the snapshot component 106 can perform a set of machine learning computations associated with generation of the snapshot data 114. For example, the snapshot component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to determine the snapshot data 114.

It is to be appreciated that the quantum simulator component 102 (e.g., the simulation component 104 and/or the snapshot component 106) performs a stochastic simulation process and/or a decoding process that cannot be performed by a human (e.g., is greater than the capability of a single human mind). For example, an amount of data processed, a speed of data processed and/or data types of data processed by the quantum simulator component 102 (e.g., the simulation component 104 and/or the snapshot component 106) over a certain period of time can be greater, faster and different than an amount, a speed and data types that can be processed by a single human mind over the same period of time. The quantum simulator component 102 (e.g., the simulation component 104 and/or the snapshot component 106) can also be fully operational towards performing one or more other functions (e.g., fully powered on, fully executed, etc.) while also performing the above-referenced stochastic simulation process and/or a decoding process. Moreover, snapshot data 114 generated by the quantum simulator component 102 (e.g., the simulation component 104 and/or the snapshot component 106) can include information that is impossible to obtain manually by a user. For example, a type of information included in the snapshot data 114, a variety of information included in the snapshot data 114, and/or an amount of information included in the snapshot data 114 can be more complex than information obtained manually by a user.

Additionally, it is to be appreciated that the system 100 can provide various advantages as compared to conventional simulators for a quantum computer. For instance, accuracy of classical simulation of a quantum computer and/or efficiency of classical simulation of a quantum computer can be improved by employing the system 100. Furthermore, an amount of time to perform a quantum simulation process, an amount of processing performed by a quantum simulation process, and/or an amount of storage utilized by a quantum simulation process can be reduced by employing the system 100. Moreover, performance a quantum circuit and/or a classical processor associated with a quantum simulator can be improved by employing the system 100, efficiency of a quantum circuit and/or a classical processor associated with a quantum simulator can be improved by employing the system 100, timing characteristics of a quantum circuit and/or a classical processor associated with a quantum simulator can be improved by employing the system 100, power characteristics of a quantum circuit and/or a classical processor associated with a quantum simulator can be improved by employing the system 100, and/or another characteristic of a quantum circuit and/or a classical processor associated with a quantum simulator can be improved by employing the system 100.

Figure 2:
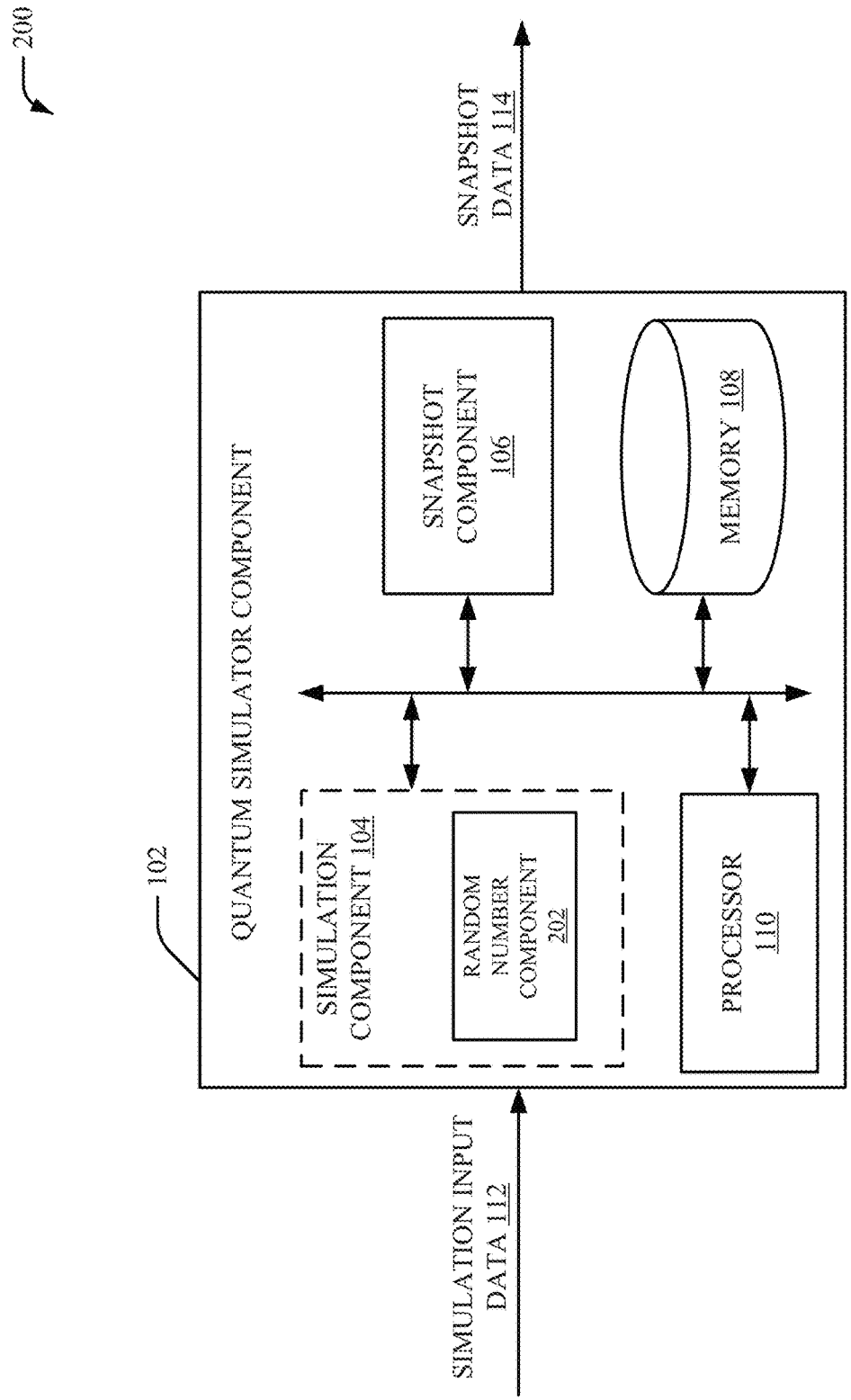
FIG. 2 illustrates a block diagram of another example, non-limiting system that includes a quantum simulator component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the quantum simulator component 102. The quantum simulator component 102 can include the simulation component 104, the snapshot component 106, the memory 108 and/or the processor 110. The simulation component 104 can include a random number component 202. The random number component 202 can facilitate a random number generation step for a stochastic simulation process (e.g., a quantum circuit simulation process). In an aspect, the random number component 202 can determine a set of random numbers. In one example, the random number component 202 can employ a pseudorandom number generator to generate the set of random numbers. However, it is to be appreciated that another random number generation technique can be employed to generate the set of random numbers. The set of random numbers can be, for example, a set of random real numbers.

In an embodiment, a random number from the set of random numbers can be a sequence of bit values that are randomly generated. In another embodiment, a random number from the set of random numbers can correspond to a value between a first value (e.g., a value equal to "0") and a second value (e.g., a value equal to "1"). In certain embodiments, the random number component 202 can initially generate the set of random numbers with limited numerical precision. Furthermore, the random number component 202 can dynamically add additional precision for the set of random numbers during the stochastic simulation process (e.g., the quantum circuit simulation process). For example, the random number component 202 can initially generate a random number from the set of random numbers with a defined number of bits (e.g., four bits, etc.). Additionally, the random number component 202 can dynamically add one or more additional bits to the random number during the stochastic simulation process (e.g., the quantum circuit simulation process). In certain embodiments, the random number component 202 can dynamically add one or more additional bits to the random number multiple times during the stochastic simulation process (e.g., the quantum circuit simulation process). In an aspect, the random number component 202 can dynamically add one or more additional bits to the random number during the stochastic simulation process (e.g., the quantum circuit simulation process) based on a determination that the stochastic simulation process (e.g., the quantum circuit simulation process) satisfies a defined criterion. For example, the random number component 202 can dynamically add one or more additional bits to the random number during the stochastic simulation process (e.g., the quantum circuit simulation process) based on a determination that the stochastic simulation process (e.g., the quantum circuit simulation process) requires additional precision. In one example, the random number component 202 can dynamically add one or more additional bits to the random number during the stochastic simulation process (e.g., the quantum circuit simulation process) based on a determination that an entropy coding process of the stochastic simulation process (e.g., the quantum circuit simulation process) requires additional precision. In another example, the random number component 202 can dynamically add one or more additional bits to the random number during the stochastic simulation process (e.g., the quantum circuit simulation process) based on a determination that an arithmetic coding process of the stochastic simulation process (e.g., the quantum circuit simulation process) requires additional precision.

Additionally, it is to be appreciated that the system 200 can provide various advantages as compared to conventional simulators for a quantum computer. For instance, accuracy of classical simulation of a quantum computer and/or efficiency of classical simulation of a quantum computer can be improved by employing the system 200. Furthermore, an amount of time to perform a quantum simulation process, an amount of processing performed by a quantum simulation process, and/or an amount of storage utilized by a quantum simulation process can be reduced by employing the system 200. Moreover, performance a quantum circuit and/or a classical processor associated with a quantum simulator can be improved by employing the system 200, efficiency of a quantum circuit and/or a classical processor associated with a quantum simulator can be improved by employing the system 200, timing characteristics of a quantum circuit and/or a classical processor associated with a quantum simulator can be improved by employing the system 200, power characteristics of a quantum circuit and/or a classical processor associated with a quantum simulator can be improved by employing the system 200, and/or another characteristic of a quantum circuit and/or a classical processor associated with a quantum simulator can be improved by employing the system 200.

Figure 3:
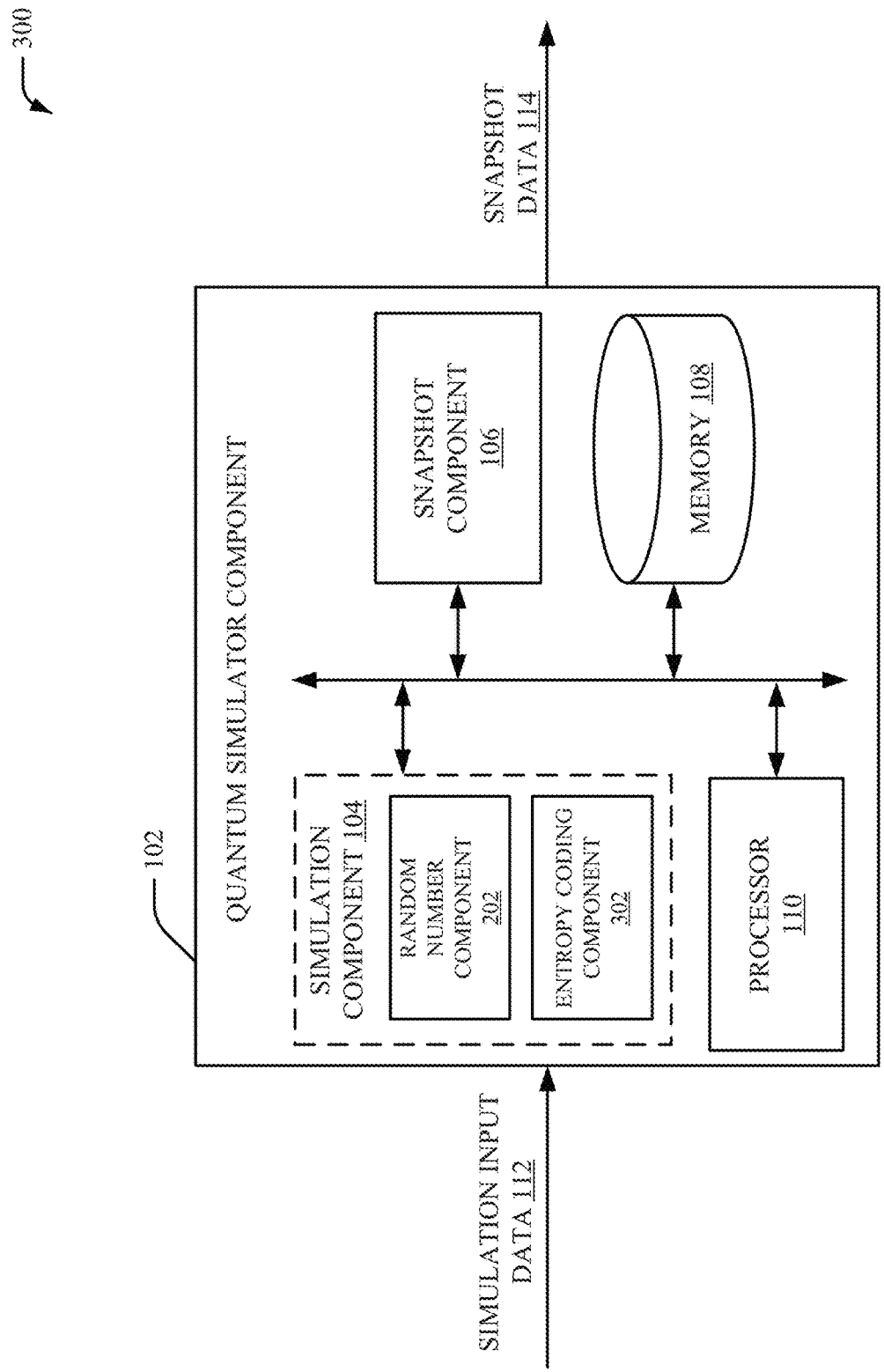
FIG. 3 illustrates a block diagram of yet another example, non-limiting system that includes a quantum simulator component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the quantum simulator component 102. The quantum simulator component 102 can include the simulation component 104, the snapshot component 106, the memory 108 and/or the processor 110. The simulation component 104 can include the random number component 202 and an entropy coding component 302. The entropy coding component 302 can facilitate an entropy coding step for a stochastic simulation process (e.g., a quantum circuit simulation process). In an aspect, the entropy coding component 302 can employ an arithmetic decoder associated with the entropy coding step. The arithmetic decoder can facilitate information-theoretic optimal data compression indicative of compression that is limited only by quality of a statistical model. In an embodiment, the arithmetic decoder can divide data into sub-intervals representing all possible data strings, where a size of a sub-interval corresponds to probability of the data string. A length of a bit-string to uniquely identify a given data string whose probability is p, is an information-theoretic optimal value equal to log 2(p). The entropy coding component 302 can employ the set of random numbers generated by the random number component 202 to facilitate the entropy coding step. In an aspect, the entropy coding component 302 can provide the set of random numbers to the arithmetic decoder to generate random samples from the simulation input data 112. In another aspect, the arithmetic decoder associated with the entropy coding component 302 can decode the set of random numbers simultaneously. In an embodiment, the stochastic simulation process (e.g., the quantum circuit simulation process) can maintain a current interval specified by the arithmetic decoder and the current interval can be reduced as the stochastic simulation process (e.g., the quantum circuit simulation process) progresses.

Additionally, it is to be appreciated that the system 300 can provide various advantages as compared to conventional simulators for a quantum computer. For instance, accuracy of classical simulation of a quantum computer and/or efficiency of classical simulation of a quantum computer can be improved by employing the system 300. Furthermore, an amount of time to perform a quantum simulation process, an amount of processing performed by a quantum simulation process, and/or an amount of storage utilized by a quantum simulation process can be reduced by employing the system 300. Moreover, performance a quantum circuit and/or a classical processor associated with a quantum simulator can be improved by employing the system 300, efficiency of a quantum circuit and/or a classical processor associated with a quantum simulator can be improved by employing the system 300, timing characteristics of a quantum circuit and/or a classical processor associated with a quantum simulator can be improved by employing the system 300, power characteristics of a quantum circuit and/or a classical processor associated with a quantum simulator can be improved by employing the system 300, and/or another characteristic of a quantum circuit and/or a classical processor associated with a quantum simulator can be improved by employing the system 300.

Figure 4:
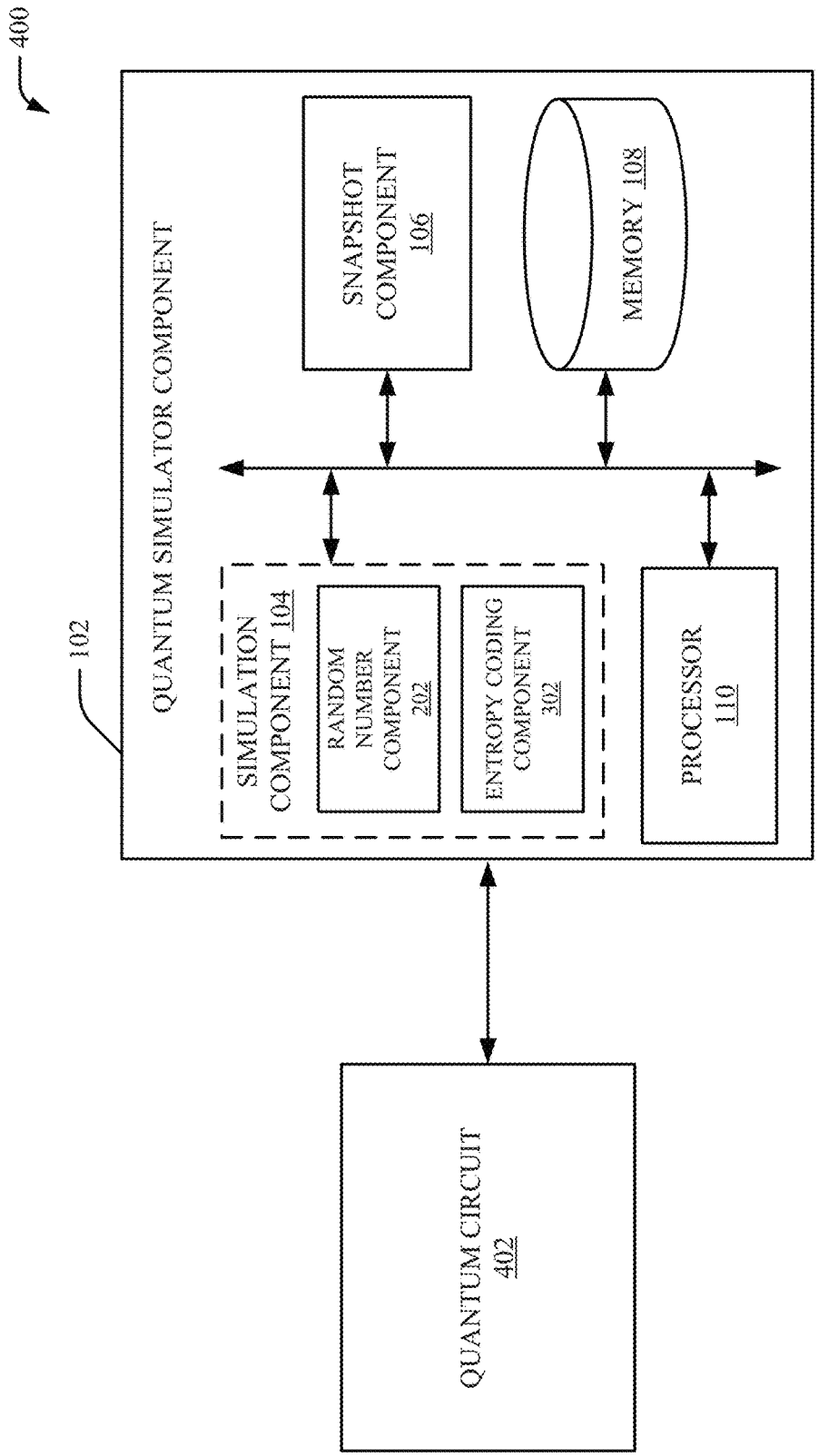
FIG. 4 illustrates a block diagram of yet another example, non-limiting system that includes a quantum simulator component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the quantum simulator component 102 and a quantum circuit 402. In an embodiment, the quantum simulator component 102 can perform a simulation of the quantum circuit 402. For example, the quantum simulator component 102 can perform a simulation of the quantum circuit 402 via wavefunction evolution indicative of a quantum model that describes changes and/or quantum effects of the quantum circuit 402 over a defined time interval. The quantum circuit 402 can be a machine that performs a set of calculations based on principle of quantum physics. For example, the quantum circuit 402 can encode and/or process information using qubits. In one embodiment, the quantum circuit 402 can be a hardware quantum processor (e.g., a hardware superconducting quantum processor) that can run encode and/or process information using qubits. For example, the quantum circuit 402 can be a hardware quantum processor that executes a set of instruction threads associated with qubits. In another embodiment, the quantum circuit 402 can be a quantum simulator that can simulate execution of a sect of processing threads on a quantum circuit.

Additionally, it is to be appreciated that the system 400 can provide various advantages as compared to conventional simulators for a quantum computer. For instance, accuracy of classical simulation of a quantum computer and/or efficiency of classical simulation of a quantum computer can be improved by employing the system 400. Furthermore, an amount of time to perform a quantum simulation process, an amount of processing performed by a quantum simulation process, and/or an amount of storage utilized by a quantum simulation process can be reduced by employing the system 400. Moreover, performance a quantum circuit and/or a classical processor associated with a quantum simulator can be improved by employing the system 400, efficiency of a quantum circuit and/or a classical processor associated with a quantum simulator can be improved by employing the system 400, timing characteristics of a quantum circuit and/or a classical processor associated with a quantum simulator can be improved by employing the system 400, power characteristics of a quantum circuit and/or a classical processor associated with a quantum simulator can be improved by employing the system 400, and/or another characteristic of a quantum circuit and/or a classical processor associated with a quantum simulator can be improved by employing the system 400.

Figure 5:
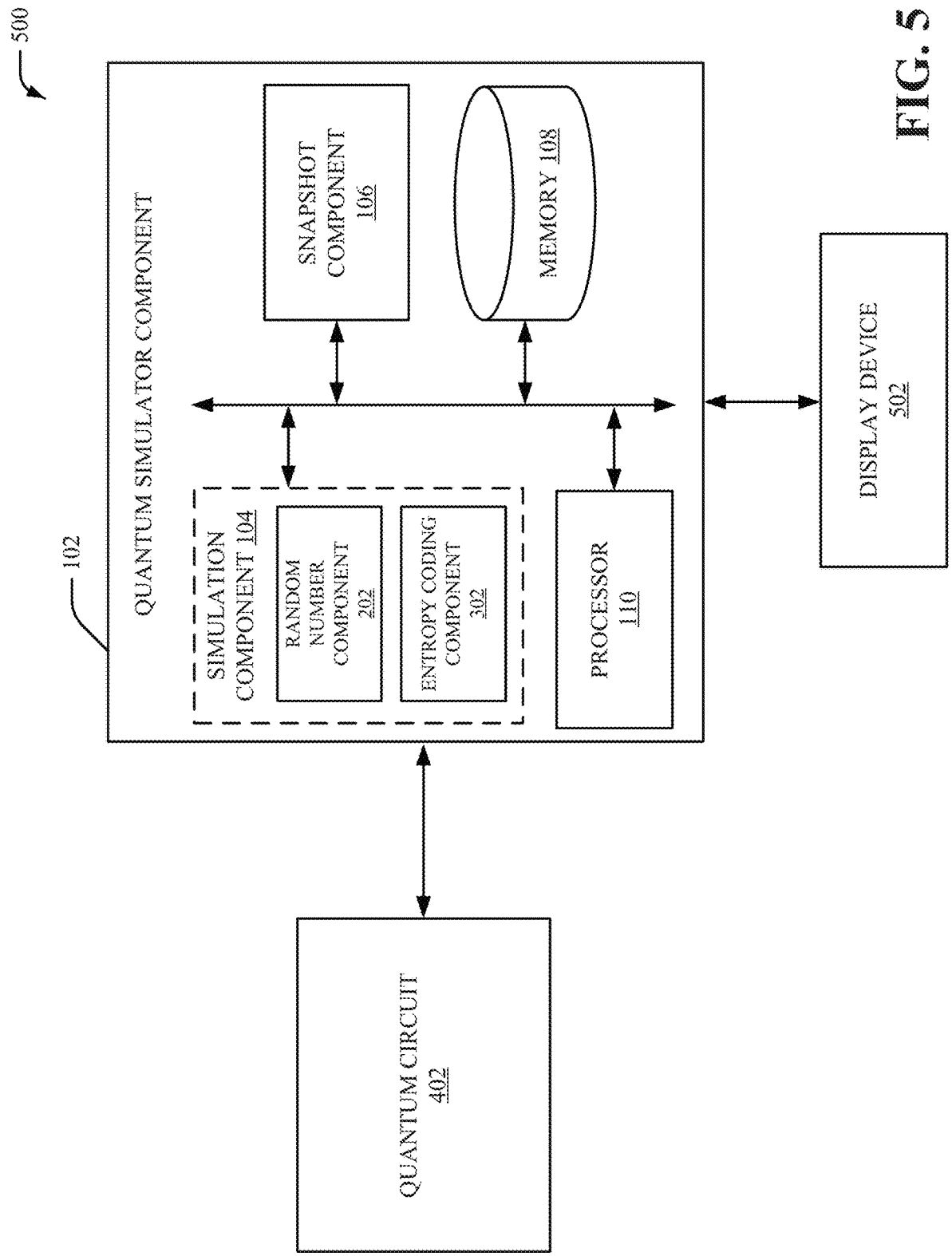
FIG. 5 illustrates a block diagram of yet another example, non-limiting system that includes a quantum simulator component in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the quantum simulator component 102, the quantum circuit 402 and/or a display device 502. The display device 502 can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In certain embodiments, the display device 502 can include an application programming interface to facilitate display of information associated with a stochastic simulation process (e.g., a quantum circuit simulation process). For example, the display device 502 can include an application programming interface to facilitate display of information related to a stochastic simulation process (e.g., a quantum circuit simulation process) associated with the quantum circuit 402. Furthermore, in certain embodiments, the display device 502 can be in communication with the quantum simulator component 102 via a network (e.g., a network device) such as, but not limited to, a local area networks (LAN), a wide area network (WAN) such as the Internet, and/or a network that provides interconnections for devices associated with a workspace environment. In an aspect, the application programming interface of the display device 502 can be a user interface to display, in a human interpretable format, information associated with a stochastic simulation process (e.g., a quantum circuit simulation process).

Additionally, it is to be appreciated that the system 500 can provide various advantages as compared to conventional simulators for a quantum computer. For instance, accuracy of classical simulation of a quantum computer and/or efficiency of classical simulation of a quantum computer can be improved by employing the system 500. Furthermore, an amount of time to perform a quantum simulation process, an amount of processing performed by a quantum simulation process, and/or an amount of storage utilized by a quantum simulation process can be reduced by employing the system 500. Moreover, performance a quantum circuit and/or a classical processor associated with a quantum simulator can be improved by employing the system 500, efficiency of a quantum circuit and/or a classical processor associated with a quantum simulator can be improved by employing the system 500, timing characteristics of a quantum circuit and/or a classical processor associated with a quantum simulator can be improved by employing the system 500, power characteristics of a quantum circuit and/or a classical processor associated with a quantum simulator can be improved by employing the system 500, and/or another characteristic of a quantum circuit and/or a classical processor associated with a quantum simulator can be improved by employing the system 500.

Figure 6:
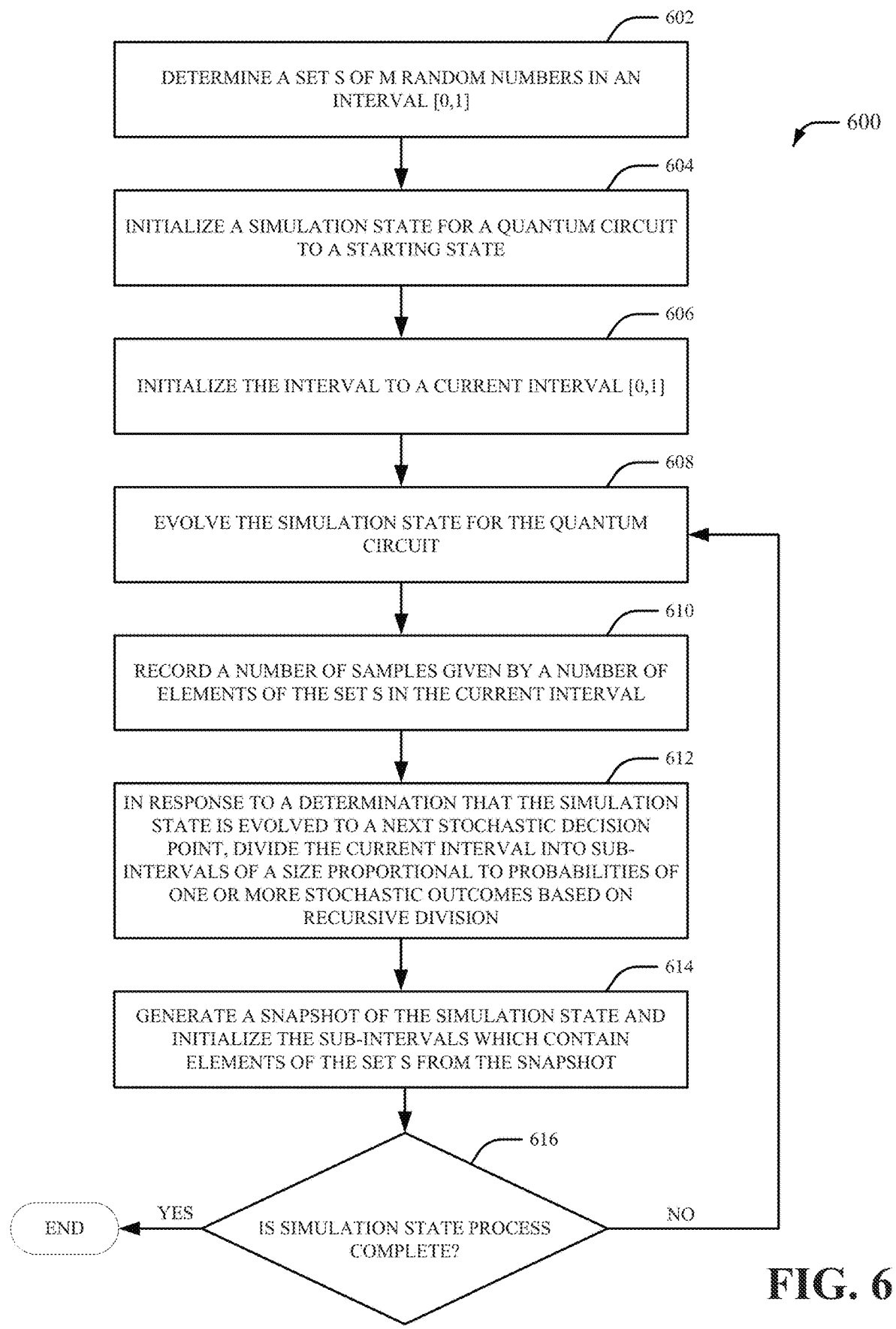
FIG. 6 illustrates an example, non-limiting system that facilitates a stochastic simulation process in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

In an embodiment, the system 600 can be associated with a stochastic simulation process (e.g., a quantum circuit simulation process) that employs an entropy coding process. In an embodiment, the system 600 can be associated with an arithmetic decoder employed by the entropy coding component 302. The stochastic simulation process associated with the system 600 can include, in part, generating random real numbers by subdividing an interval, using the random real numbers to generate a decision tree which an arithmetic decoder can map to a specific path in a simulation of an evolution of a quantum system with stochastic operations. Samples during the stochastic simulation process associated with the system 600 can represent points in the interval. Furthermore, a path through the decision tree can be determined based on which interval the samples are located within. A stochastic aspect of the stochastic simulation process associated with the system 600 can be due to measurements performed on a state of a quantum system (e.g., a quantum circuit) or stochastic error processes that are simulated to model physical error mechanisms that occur in a quantum system (e.g., a quantum circuit). Snapshotting can also be employed during the stochastic simulation process associated with the system 600 to minimize number of times early paths in a decision tree are traversed to available memory and/or to minimize storage of a computing device (e.g., a processor, a classical processor, etc.) employed to implement the stochastic simulation process associated with the system 600. In an embodiment, the system 600 includes a step 602 for the stochastic simulation process, a step 604 for the stochastic simulation process, a step 606 for the stochastic simulation process, a step 608 for the stochastic simulation process, a step 610 for the stochastic simulation process, a step 612 for the stochastic simulation process, a step 614 for the stochastic simulation process, a step 616 for the stochastic simulation process, and a step 616 for the stochastic simulation process. At the step 602, a set S of M random numbers in an interval [0,1] is determined. At the step 604, a simulation state for a quantum circuit is initialized to a starting state. At the step 606, the interval is initialized to a current interval [0,1]. At the step 608, the simulation state for the quantum circuit is evolved. At the step 610, a number of samples given by a number of elements of the set S in the current interval is recorded. At the step 612, in response to a determination that the simulation state is evolved to a next stochastic decision point, the current interval is divided into sub-intervals of a size proportional to probabilities of one or more stochastic outcomes based on recursive division. At the step 614, a snapshot of the simulation state is generated and the sub-intervals which contain elements of the set S from the snapshot are initialized. At the step 616, it is determined whether the simulation state process is complete. If no, the stochastic simulation process associated with the system 600 returns to step 608. If yes, the stochastic simulation process associated with the system 600 ends.

In certain embodiments, the step 612 can determine if the set S has elements that fall within only one sub-interval, or if the set S has elements within more than one of the sub-intervals. If the set S has elements that fall within only one sub-interval: the current interval can be updated to the particular sub-interval with the elements and the stochastic simulation process associated with the system 600 can return to step 608 without generating a snapshot. However, if the set S has elements within more than one of the sub-intervals, the stochastic simulation process associated with the system 600 can proceed to step 614. In an aspect, after all sub-intervals have been sampled, one or more snapshots for the stochastic simulation process associated with the system 600 can be deleted. In certain embodiments, recursive division of the sub-intervals can be performed using a finite-precision binary representation of the interval based on an entropy coding algorithm (e.g., an arithmetic coding algorithm).

In an alternate embodiment, a stochastic simulation process can be performed without generating random numbers explicitly at a beginning of the stochastic simulation process. For instance, a set K can be set equal to M and a simulation state can be initialized to a starting state. Furthermore, the simulation state can be evolved.

If the simulation state is evolved to an end of the simulation, an outcome for a number of samples given by the set K can be recorded. If the simulation state is evolved to a stochastic decision point, a number of possible outcomes of the stochastic decision point and corresponding probabilities of the possible outcomes can be determined. Depending on a type of decision point, the probabilities can be dependent or independent of a current state of the stochastic simulation process. The number of samples K can be randomly partitioned across outcomes in accordance with the probability of the outcomes. Additionally, it can be determined whether the samples are associated with one outcome or more than one outcome. If all samples are in one outcome, the simulation state can be further evolved without taking a snapshot. However, if samples are included in more than one outcome, a snapshot of the simulation state can be generated at the decision point and for one or more outcomes with a non-zero number of samples, K can be set equal to a number of samples for that outcome, the simulation state from the snapshot can be initialized, the and the simulation state can be further evolved. It is to be appreciated that it can be determined at a branch point whether a first branch or a second branch should be utilized given a full set of random numbers. Therefore, optimal decisions regarding processing and/or a location for a checkpoint during a stochastic simulation process can be achieved. In a non-limiting example, a checkpoint can be performed in response to a determination that a first branch and a second branch are utilized for processing. As such, zero duplicate computations can be achieved and a number of snapshots can be equal to a depth of a decision tree for the stochastic simulation process. In another non-limiting example, a number of snapshots to generate can be optimally determined during the stochastic simulation process.

Figure 7:
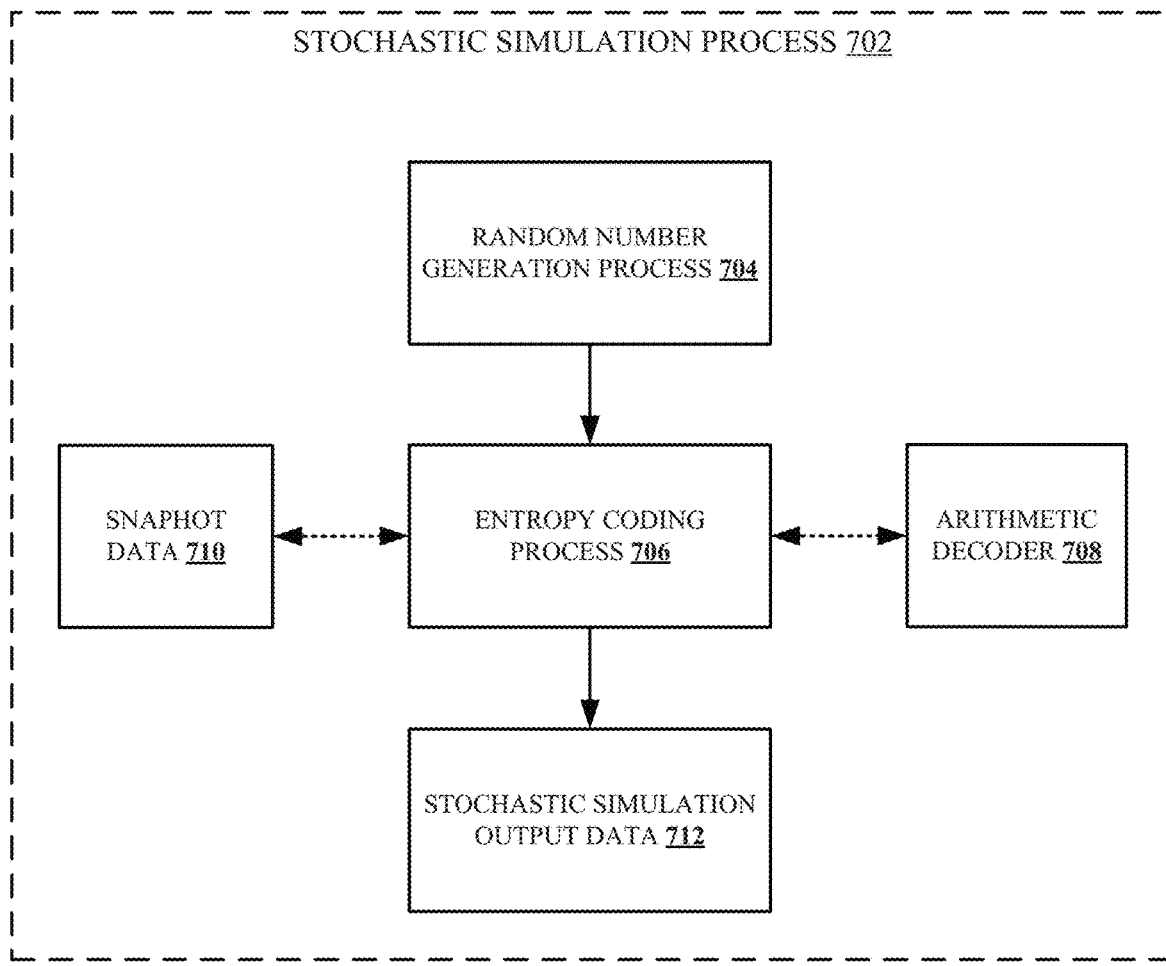
FIG. 7 illustrates an example, non-limiting system associated with a stochastic simulation process in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes a stochastic simulation process 702. The stochastic simulation process 702 can be, for example, a quantum circuit simulation process associated with a quantum circuit. In an aspect, the stochastic simulation process 702 can be performed by the quantum simulator component 102. The stochastic simulation process 702 can include a random number generation process 704. The random number generation process 704 can be performed, for example, by the random number component 202. The random number generation process 704 can generate a set of random numbers. Furthermore, the random number generation process 704 can be performed prior to an entropy coding process 706. For instance, the set of random numbers generated by the random number generation process 704 can be generated based on a required sample size for the entropy coding process 706. The entropy coding process 706 can be performed based on the set of random numbers generated by the random number generation process 704. In an example, the entropy coding process 706 can be an arithmetic coding process. In an embodiment, the entropy coding process 706 can be performed by an arithmetic decoder 708. For example, the arithmetic decoder 708 can decode the set of random numbers generated by the random number generation process 704 simultaneously. In another embodiment, the entropy coding process 706 can generate snapshot data 710. The snapshot data 710 can be indicative of information regarding a full state of the stochastic simulation process 702. In an aspect, the snapshot data 710 can be captured at a branch point associated with the entropy coding process 706. Additionally or alternatively, the snapshot data 710 can be employed by the entropy coding process 706 to reduce a number of calculation performed by the stochastic simulation process 702 and/or the entropy coding process 706.

Figure 8:
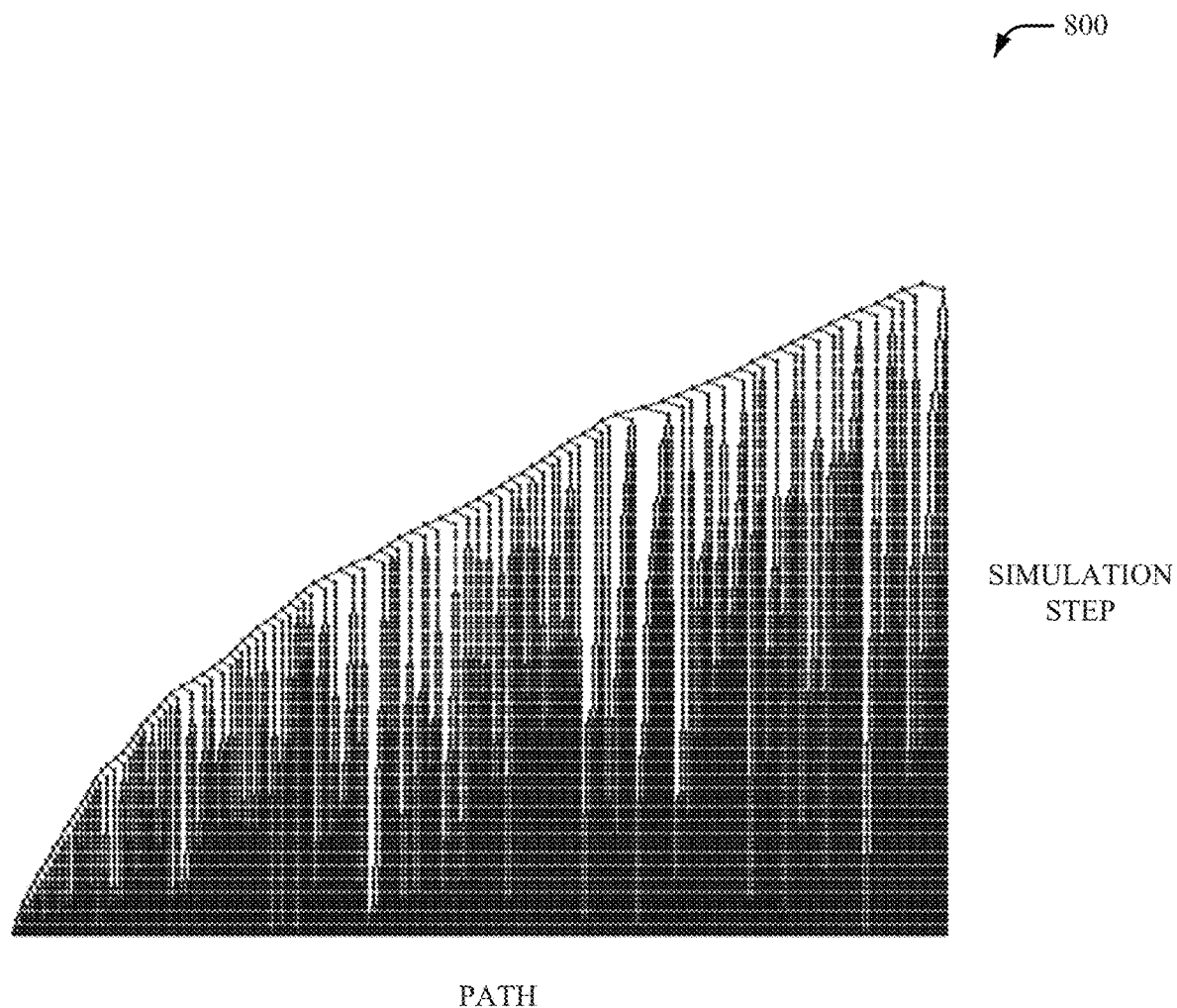
FIG. 8 illustrates an example, non-limiting graph that illustrates a decision tree process in accordance with one or more embodiments described herein.

FIG. 8 illustrates a block diagram of an example, non-limiting graph 800 in accordance with one or more embodiments described herein. Repetitive description of like elements employed in other embodiments described herein is omitted for sake of brevity.

The graph 800 illustrates a decision tree process associated with a stochastic simulation process in accordance with one or more embodiments described herein. A horizontal axis of the graph 800 depicts a set of paths of a decision tree. A vertical axis of the graph 900 depicts simulation step for the stochastic simulation process. As shown in the graph 800, an interval for processing can be divided into a decision tree based on branch points. Furthermore, random number samples can be employed to select branches. In an embodiment, the decision tree process illustrated by the graph 800 can include, in part, generating random real numbers by subdividing an interval, using the random real numbers to generate a decision tree which an arithmetic decoder can map to a specific path in a simulation of an evolution of a quantum system with stochastic operations. Samples during the decision tree process illustrated by the graph 800 can represent points in the interval. Furthermore, a path through the decision tree can be determined based on which interval the samples are located within. A stochastic aspect of the stochastic simulation process associated with the decision tree process illustrated by the graph 800 can be due to measurements performed on a state of a quantum system (e.g., a quantum circuit) or stochastic error processes that are simulated to model physical error mechanisms that occur in a quantum system (e.g., a quantum circuit). Snapshotting can also be employed during the decision tree process illustrated by the graph 800 to minimize number of times early paths in a decision tree are traversed to available memory and/or to minimize storage of a computing device (e.g., a processor, a classical processor, etc.) employed to implement the decision tree process illustrated by the graph 800. As such, simulation (e.g., classical simulation) of a quantum circuit as disclosed herein can be improved as compared to conventional simulation techniques for a quantum circuit.

Figure 9:
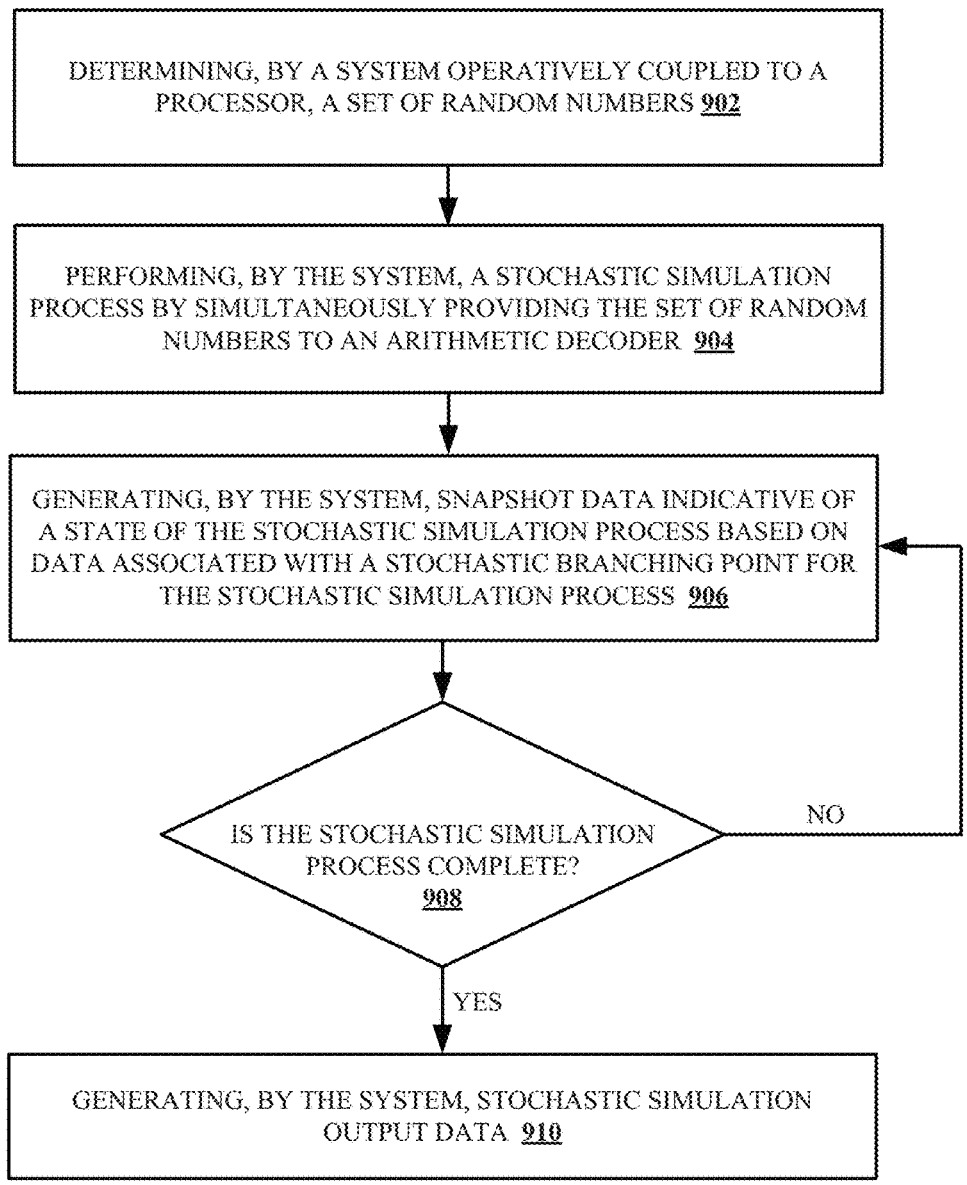
FIG. 9 illustrates a flow diagram of an example, non-limiting computer-implemented method for improving a quantum simulator in accordance with one or more embodiments described herein.

FIG. 9 illustrates a flow diagram of an example, non-limiting computer-implemented method 900 for improving a quantum simulator in accordance with one or more embodiments described herein. At 902, a set of random numbers is determined, by a system operatively coupled to a processor (e.g., by simulation component 104). In one example, a pseudorandom number generator can be employed to generate the set of random numbers. The set of random numbers can be, for example, a set of random real numbers. In an embodiment, a random number from the set of random numbers can be a sequence of bit values that are randomly generated. In another embodiment, a random number from the set of random numbers can correspond to a value between a first value (e.g., a value equal to "0") and a second value (e.g., a value equal to "1"). In certain embodiments, the set of random numbers can be initially generated with limited numerical precision. Furthermore, additional precision for the set of random numbers can be dynamically added during a stochastic simulation process.

At 904, a stochastic simulation process is performed, by the system (e.g., by simulation component 104), by simultaneously providing the set of random numbers to an arithmetic decoder. The stochastic simulation process can be, for example, a simulation process that analyzes, monitors and/or simulates transformation of outcomes for the simulation process that can change randomly. In one embodiment, the stochastic simulation process can be a quantum circuit simulation process for a quantum simulator. For example, the quantum circuit simulation process can be, for example, a simulation process for a quantum circuit that employs qubits to encode information and/or perform one or more calculations. As such, in certain embodiments, performing the stochastic simulation process can include performing a quantum circuit simulation process associated with a quantum circuit based on the set of random numbers.

At 906, snapshot data indicative of a state of the stochastic simulation process is generated, by the system (e.g., by snapshot component 106), based on data associated with a stochastic branching point for the stochastic simulation process. The stochastic branching point can be a branch point during the stochastic simulation process. For example, the stochastic branching point can be a stochastic decision point during the stochastic simulation process. In an embodiment, the snapshot data can be indicative of a state of the quantum circuit simulation process.

At 908, it is determined whether the stochastic simulation process is complete. If no, the computer-implemented method 900 returns to 906. For example, the computer-implemented method 900 can return to 906 to generate additional snapshot data associated with the stochastic simulation process. If yes, the computer-implemented method 900 proceeds to 910.

At 910, stochastic simulation output data is generated by the system (e.g., by simulation component 104). For example, a set of samples of outcomes from the stochastic simulation process can be generated. In one example, a set of samples of outcomes from the quantum circuit simulation process (e.g., from a quantum simulator) can be generated.

In certain embodiments, the computer-implemented method 900 can include performing, by the system, one or more other portions of the stochastic simulation process based on the snapshot data indicative of the state of the stochastic simulation process. In certain embodiments, the computer-implemented method 900 can include avoiding, by the system, processing of one or more other portions of the stochastic simulation process based on the snapshot data indicative of the state of the stochastic simulation process. In certain embodiments, the computer-implemented method 900 can include altering, by the system, a random number from the set of random numbers to provide improved numerical precision during the stochastic simulation process. In certain embodiments, the computer-implemented method 900 can include performing, by the system, a quantum circuit simulation process associated with a quantum circuit by simultaneously providing the set of random numbers to an arithmetic decoder. Additionally or alternatively, the computer-implemented method 900 can include generating, by the system, snapshot data indicative of a state of the quantum circuit simulation process based on data associated with a stochastic branching point for the quantum circuit simulation process. In certain embodiments, the computer-implemented method 900 can include performing, by the system, one or more other portions of the quantum circuit simulation process based on the snapshot data indicative of the state of the quantum circuit simulation process.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least performing a stochastic simulation process, generating snapshot data, generating stochastic simulation output data, etc. are established from a combination of electrical and mechanical components and circuitry, a human is unable to replicate or perform processing performed by the quantum simulator component 102 (e.g., the simulation component 104, the snapshot component 106, the random number component 202 and/or the entropy coding component 302) disclosed herein. For example, a human is unable to perform a stochastic simulation process, generate snapshot data, generate stochastic simulation output data, etc.

Figure 10:
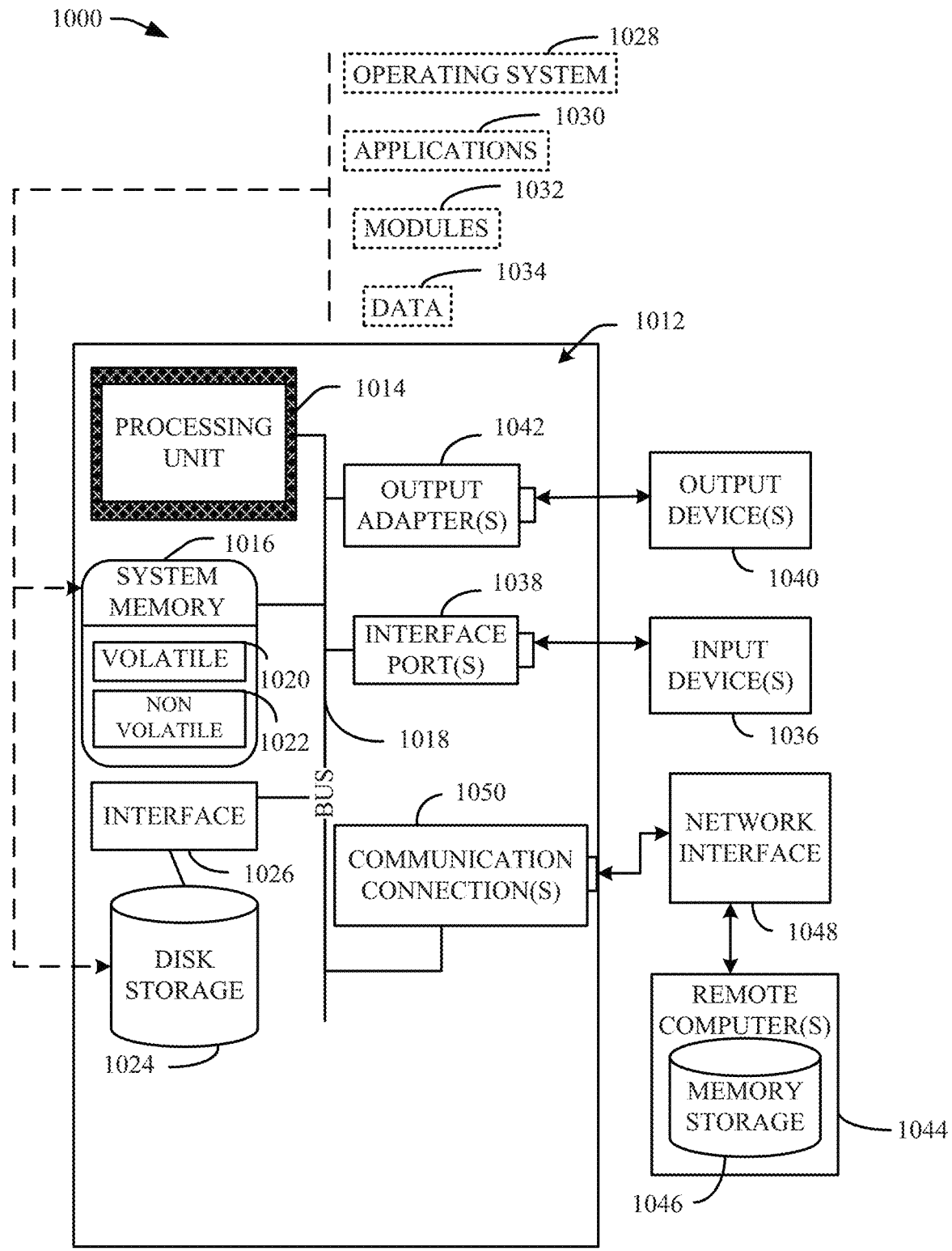
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data torage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes the computer executable components stored in the memory, wherein the computer executable components comprise:
      a simulation component that:
         determines a set of random numbers, and
         employs an arithmetic decoder using the set of random numbers to perform a stochastic simulation process for a quantum simulator representing a quantum computer, wherein the stochastic simulation process comprises a set of stochastic branching points representing decision points in the stochastic simulation process; and
      a snapshot component that generates snapshot data indicative of a state of the stochastic simulation process based on data associated with a stochastic branching point of the set of stochastic branching points in the stochastic simulation process, wherein the snapshot data comprises one or more results of calculations performed during the stochastic simulation process before the stochastic branching point;
      wherein the simulation component reuses the one or more results of calculations in the snapshot data for computations during a plurality of branches of the stochastic simulation process after the stochastic branching point.

2. The system of claim 1, wherein the stochastic branching point is related to a noise event associated with the quantum simulator.

3. The system of claim 1, wherein the simulation component generates a quantum wavefunction for the stochastic simulation process based on the data associated with the stochastic branching point for the stochastic simulation process.

4. The system of claim 1, wherein the stochastic branching point is related to a measurement associated with the quantum simulator.

5. The system of claim 1, wherein the arithmetic decoder decodes the set of random numbers concurrently.

6. The system of claim 1, wherein the simulation component avoids processing one or more portions of the stochastic simulation process based on the snapshot data that is indicative of the state of the stochastic simulation process.

7. The system of claim 1, wherein the simulation component updates a data list for the stochastic simulation process based on the snapshot data that is indicative of the state of the stochastic simulation process.

8. The system of claim 1, wherein the simulation component adds the set of random numbers to a data list for the stochastic simulation process and updates one or more indices in the data list at the stochastic branching point for the stochastic simulation process.

9. The system of claim 8, wherein the simulation component partitions the data list based on a binary search process at the stochastic branching point for the stochastic simulation process.

10. The system of claim 1, wherein the set of random numbers has a first numerical precision, and the simulation component, in response to the stochastic simulation process satisfying a defined criterion, alters a random number from the set of random numbers to a second numerical precision, wherein the second numerical precision has a higher numerical precision than the first numerical precision.

11. The system of claim 10, wherein the first numerical precision has a first quantity of bits and the second numerical precision has a second quantity of bits, wherein the second quantity of bits is higher than the first quantity of bits.

12. A computer-implemented method, comprising:
   determining, by a system operatively coupled to a processor, a set of random numbers; and
   performing, by the system, via an arithmetic decoder using the set of random numbers, a stochastic simulation process for a quantum simulator representing a quantum computer, wherein the stochastic simulation process comprises a set of stochastic branching points representing decision points in the stochastic simulation process, and the performing comprises:
  generating snapshot data indicative of a state of the stochastic simulation process based on data associated with a stochastic branching point of the set of stochastic branching points in the stochastic simulation process, wherein the snapshot data comprises one or more results of calculations performed during the stochastic simulation process before the stochastic branching point, and
  reusing the one or more results of calculations in the snapshot data for computations during a plurality of branches of the stochastic simulation process after the stochastic branching point.

13. The computer-implemented method of claim 12, wherein the stochastic branching point is related to a noise event associated with the quantum simulator.

14. The computer-implemented method of claim 12, wherein the stochastic branching point is related to a measurement associated with the quantum simulator.

15. The computer-implemented method of claim 12, wherein the performing further comprises:
  avoiding, by the system, processing of one or more other portions of the stochastic simulation process based on the snapshot data indicative of the state of the stochastic simulation process.

16. The computer-implemented method of claim 12, wherein the set of random numbers has a first numerical precision, and the performing further comprises:
  in response to the stochastic simulation process satisfying a defined criterion, altering a random number from the set of random numbers to a second numerical precision, wherein the second numerical precision has a higher numerical precision than the first numerical precision.

17. The computer-implemented method of claim 16, wherein the first numerical precision has a first quantity of bits and the second numerical precision has a second quantity of bits, wherein the second quantity of bits is higher than the first quantity of bits.

18. A computer program product for improving a quantum simulator, the computer program product comprising a computer readable storage medium having program instructions embodied therewith, the program instructions executable by a processor to cause the processor to:
  determine, by the processor, a set of random numbers; and
  perform, by the processor, via an arithmetic decoder using the set of random numbers, a quantum circuit simulation process associated with a quantum circuit, wherein the quantum circuit simulation process comprises a set of stochastic branching points representing decision points in the quantum circuit simulation process, and the performing comprises:
    generate snapshot data indicative of a state of the quantum circuit simulation process based on data associated with a stochastic branching point of the set of stochastic branching points in the quantum circuit simulation process wherein the snapshot data comprises one or more results of calculations performed during the quantum circuit simulation process before the stochastic branching point, and
    reusing the one or more results of calculations in the snapshot data for computations during a plurality of branches of the quantum circuit simulation process after the stochastic branching point.

19. The computer program product of claim 18, wherein the stochastic branching point is related to a noise event associated with the quantum circuit.

20. The computer program product of claim 18, wherein the set of random numbers has a first numerical precision, and the performing further comprises:
  in response to the quantum circuit simulation process satisfying a defined criterion, alter a random number from the set of random numbers to a second numerical precision, wherein the second numerical precision has a higher numerical precision than the first numerical precision.

21. A system, comprising:
  a memory that stores computer executable components;
  a processor that executes the computer executable components stored in the memory, wherein the computer executable components comprise:
    a random number component that generates a set of random numbers;
    an entropy coding component that performs, via an arithmetic decoder, entropy coding based on the set of random numbers during a stochastic simulation process representing a quantum circuit, wherein the stochastic simulation process comprises a set of stochastic branching points representing decision points in the stochastic simulation process; and
    a snapshot component that generates snapshot data indicative of a state of the stochastic simulation process based on data associated with a stochastic branching point of the set of stochastic branching points in for the stochastic simulation process, wherein the snapshot data comprises one or more results of calculations performed during the stochastic simulation process before the stochastic branching point;
    wherein the entropy coding component reuses the one or more results of calculations in the snapshot data for computations during a plurality of branches of the stochastic simulation process after the stochastic branching point.

22. The system of claim 21, wherein the stochastic branching point is related to a measurement associated with the quantum circuit.

23. The system of claim 21, wherein the set of random numbers has a first numerical precision, and the random number component, in response to the stochastic simulation process satisfying a defined criterion, alters a random number from the set of random numbers to a second numerical precision, wherein the second numerical precision has a higher numerical precision than the first numerical precision.

24. A computer-implemented method, comprising:
  generating, by a system operatively coupled to a processor, a set of random numbers;
  performing, by the system, via an arithmetic decoder using the set of random numbers, a quantum circuit simulation process associated with a quantum circuit, wherein the quantum circuit simulation process comprises a set of stochastic branching points representing decision points in the quantum circuit simulation process, and the performing comprises:
    generating snapshot data indicative of a state of the quantum circuit simulation process based on data associated with a stochastic branching point of the set of stochastic branching points in the quantum circuit simulation process, wherein the snapshot data comprises one or more results of calculations performed during the quantum circuit simulation process before the stochastic branching point, and reusing the one or more results of calculations in the snapshot data for computations during a plurality of branches of the quantum circuit simulation process after the stochastic branching point.

25. The computer-implemented method of claim 24, wherein the set of random numbers has a first numerical precision, and the performing further comprises:

in response to the quantum circuit simulation process satisfying a defined criterion, altering a random number from the set of random numbers to a second numerical precision, wherein the second numerical precision has a higher numerical precision than the first numerical precision.

\* \* \* \* \*